(12) United States Patent
Yamada et al.

(10) Patent No.: US 10,575,323 B2
(45) Date of Patent: Feb. 25, 2020

(54) SYSTEMS AND METHODS FOR A PHYSICAL UPLINK CONTROL CHANNEL ON A SECONDARY CELL

(71) Applicant: Sharp Kabushiki Kaisha, Sakai, Osaka (JP)

(72) Inventors: Shohei Yamada, Sakai (JP); Katsunari Uemura, Sakai (JP); Yasuyuki Kato, Sakai (JP); Hidekazu Tsuboi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/553,655

(22) PCT Filed: Mar. 18, 2016

(86) PCT No.: PCT/JP2016/001611
§ 371 (c)(1),
(2) Date: Aug. 25, 2017

(87) PCT Pub. No.: WO2016/157809
PCT Pub. Date: Oct. 6, 2016

(65) Prior Publication Data
US 2018/0035453 A1 Feb. 1, 2018

Related U.S. Application Data

(60) Provisional application No. 62/139,234, filed on Mar. 27, 2015.

(51) Int. Cl.
*H04W 72/12* (2009.01)
*H04L 5/00* (2006.01)
(Continued)

(52) U.S. Cl.
CPC ....... *H04W 72/1284* (2013.01); *H04L 5/0053* (2013.01); *H04L 5/0078* (2013.01);
(Continued)

(58) Field of Classification Search
CPC .................................................. H04W 72/1284
See application file for complete search history.

(56) References Cited

U.S. PATENT DOCUMENTS

2015/0312930 A1* 10/2015 Han .................. H04W 72/1247
370/336
2016/0270110 A1* 9/2016 Dinan ................... H04L 5/0053

FOREIGN PATENT DOCUMENTS

EP 3 105 879 A1 12/2016

OTHER PUBLICATIONS

Official Communication issued in International Patent Application No. PCT/JP2016/001611, dated Jun. 7, 2016.
(Continued)

*Primary Examiner* — Jason E Mattis
(74) *Attorney, Agent, or Firm* — Keating & Bennett, LLP

(57) ABSTRACT

A method by a user equipment (UE) is described. The method includes receiving, an evolved Node B (eNB) a RRC message including a parameter related to a SR periodicity for a secondary cell and a parameter related to a SR prohibit timer; and setting the SR prohibit timer based on the SR periodicity for the secondary cell. Setting the SR prohibit timer may be further based on the SR periodicity for the primary cell.

4 Claims, 12 Drawing Sheets

(51) Int. Cl.
*H04W 76/27* (2018.01)
*H04W 72/04* (2009.01)
*H04W 88/02* (2009.01)
*H04W 88/08* (2009.01)

(52) U.S. Cl.
CPC ... *H04W 72/0413* (2013.01); *H04W 72/1289* (2013.01); *H04W 76/27* (2018.02); *H04L 5/001* (2013.01); *H04W 88/02* (2013.01); *H04W 88/08* (2013.01)

(56) References Cited

OTHER PUBLICATIONS

"3rd Generation Partnership Project; Technical Specification Group Radio Access Network; Evolved Universal Terrestrial Radio Access (E-UTRA); Physical layer procedures (Release 12)", 3GPP TS 36.213 V12.8.0, Dec. 2015, pp. 1-241.
"3rd Generation Partnership Project; Technical Specification Group Radio Access Network; Evolved Universal Terrestrial Radio Access (E-UTRA); Multiplexing and channel coding (Release 12)", 3GPP TS 36.212 V12.7.0, Dec. 2015, pp. 1-94.
"3rd Generation Partnership Project; Technical Specification Group Radio Access Network; Evolved Universal Terrestrial Radio Access (E-UTRA); Physical channels and modulation (Release 12)", 3GPP TS 36.211 V12.8.0, Dec. 2015, pp. 1-136.
MediaTek Inc., "Remaining issues for PUCCH on SCell", 3GPP TSG-RAN2 #89bis Meeting, R2-151252, Apr. 20-24, 2015, pp. 1-4.
Huawei et al., "Issues for SR on PUCCH Scell", 3GPP TSG-RAN WG2 Meeting #90, R2-152273, May 25-29, 2015, 3 pages.
ETSI MCC, "Draft Report of 3GPP TSG RAN WG2 meeting #89", 3GPP TSG-RAN Working Group 2 meeting #89bis, R2-151002, Apr. 20-24, 2015, 5 pages.

* cited by examiner

SYSTEMS AND METHODS FOR A PHYSICAL UPLINK CONTROL CHANNEL ON A SECONDARY CELL

TECHNICAL FIELD

The present disclosure relates generally to communication systems. More specifically, the present disclosure relates to systems and methods for a physical uplink control channel on a secondary cell.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

SUMMARY OF INVENTION

Technical Problem

As wireless communication devices have advanced, improvements in communication capacity, speed, flexibility, low complexity and efficiency have been sought. However, improving communication capacity, speed, flexibility, low complexity and efficiency may present certain problems.

For example, wireless communication devices may communicate with one or more devices using multiple cells. However, the multiple cells may only offer limited flexibility and efficiency. As illustrated by this discussion, systems and methods that improve communication flexibility and efficiency may be beneficial.

Solution to Problem

According to the present invention, there is provided a method by a user equipment (UE), comprising: Receiving, from an evolved Node B (eNB), a RRC message including a parameter related to a Scheduling Request (SR) periodicity for a Physical Uplink Control Channel (PUCCH) secondary cell and a parameter related to a SR prohibit timer; and setting the SR prohibit timer based on shortest SR period of a primary cell and the PUCCH secondary cell.

According to the present invention, there is provided a method by an evolved Node B (eNB), comprising: Transmitting, to a user equipment (UE), a RRC message including a parameter related to a Scheduling Request (SR) periodicity for a Physical Uplink Control Channel (PUCCH) secondary cell and a parameter related to a SR prohibit timer; and considering that the UE sets the SR prohibit timer based on shortest SR period of a primary cell and the PUCCH secondary cell.

According to the present invention, there is provided a user equipment (UE), comprising: a processing circuitry configured and/or programmed to: receive, from an evolved Node B (eNB), a RRC message including a parameter related to a Scheduling Request (SR) periodicity for a Physical Uplink Control Channel (PUCCH) secondary cell and a parameter related to a SR prohibit timer; and set the SR prohibit timer based on shortest SR period of a primary cell and the PUCCH secondary cell.

According to the present invention, there is provided an evolved Node B (eNB), comprising: a processing circuitry configured and/or programmed to: transmit, to a user equipment (UE), a RRC message including a parameter related to a Scheduling Request (SR) periodicity for a Physical Uplink Control Channel (PUCCH) secondary cell and a parameter related to a SR prohibit timer; and consider that the UE set the SR prohibit timer based on shortest SR period of a primary cell and the PUCCH secondary cell.

DESCRIPTION OF EMBODIMENTS

Detailed Description

Figure 1:
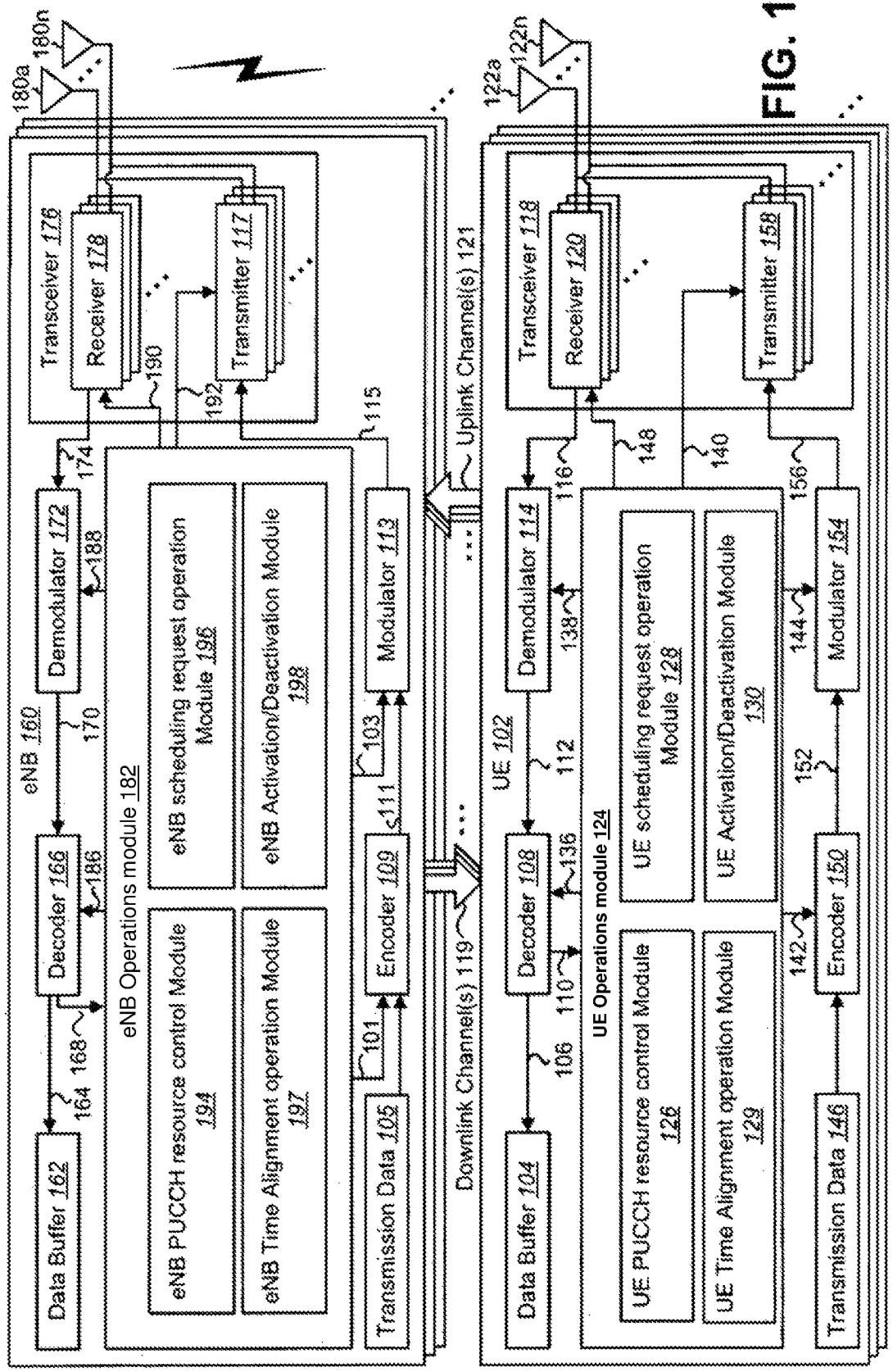
FIG. 1 is a block diagram illustrating one configuration of one or more evolved Node Bs (eNBs) and one or more user equipments (UEs) in which systems and methods for a physical uplink control channel on a secondary cell may be implemented.

A method for by a user equipment (UE) is described. The method includes receiving a RRC message including a first parameter related to a maximum number of scheduling request transmission for a secondary cell, performing a scheduling request procedure based on the first parameter, and transmitting a scheduling request on a Physical Uplink Control Channel (PUCCH) on the secondary cell. The RRC message further includes a second parameter related to a maximum number of scheduling request transmission for a primary cell and the scheduling request procedure is performed further based on the second parameter.

A method for by a user equipment (UE) is described. The method includes transmitting a RRC message including a first parameter related to a maximum number of scheduling request transmission for a secondary cell, and receiving a scheduling request on a Physical Uplink Control Channel (PUCCH) on the secondary cell, wherein a scheduling request procedure is performed based on the first parameter. The RRC message further includes a second parameter related to a maximum number of scheduling request transmission for a primary cell and the scheduling request procedure is performed further based on the second parameter.

A user equipment (UE) is described. The UE includes a processing circuitry. The processing circuitry is configured and/or programmed to receive a RRC message including a first parameter related to a maximum number of scheduling request transmission for a secondary cell, perform a scheduling request procedure based on the first parameter, and transmit a scheduling request on a Physical Uplink Control Channel (PUCCH) on the secondary cell. The RRC message further includes a second parameter related to a maximum number of scheduling request transmission for a primary cell and the scheduling request procedure is performed further based on the second parameter.

An evolved Node B (eNB) is described. The eNB includes a processing circuitry is configured and/or programmed to transmit a RRC message including a first parameter related to a maximum number of scheduling request transmission for a secondary cell, and receive a scheduling request on a Physical Uplink Control Channel (PUCCH) on the secondary cell, wherein a scheduling request procedure is performed based on the first parameter. The RRC message further includes a second parameter related to a maximum number of scheduling request transmission for a primary cell and the scheduling request procedure is performed further based on the second parameter.

Another method by a user equipment (UE) is described. The method includes setting a value related to the maximum number of scheduling request transmission based on whether a secondary cell is activated, and instructing a physical layer of the UE to signal a scheduling request (SR) on a Physical Uplink Control Channel (PUCCH) based on whether scheduling request counter is less than the maximum number of scheduling request transmission. The scheduling request counter is incremented in a case that the scheduling request counter is less than the maximum number of scheduling request transmission. The method may further include transmitting, to an evolved Node B (eNB) the SR on either or both of the PUCCH on a primary cell and the PUCCH on a secondary cell.

Another method by an evolved Node B (eNB) is described. The method includes transmitting, to a user equipment (UE), an Activation/Deactivation Medium Access Control (MAC) Control Element (CE), and receiving, from a user equipment (UE), a scheduling request (SR) on a Physical Uplink Control Channel (PUCCH). The SR is transmitted by the UE based on whether scheduling request counter is less than the maximum number of scheduling request transmission and the scheduling request counter is incremented in a case that the scheduling request counter is less than the maximum number of scheduling request transmission and a value related to the maximum number of scheduling request transmission is set based on whether a secondary cell is activated. The SR may be transmitted on either or both of the PUCCH on a primary cell and the PUCCH on a secondary cell.

Another user equipment (UE) is described. The UE includes a processing circuitry. The processing circuitry is configured and/or programmed to set a value related to the maximum number of scheduling request transmission based on whether a secondary cell is activated, and instruct a physical layer of the UE to signal a scheduling request (SR) on a Physical Uplink Control Channel (PUCCH) based on whether scheduling request counter is less than the maximum number of scheduling request transmission. The scheduling request counter is incremented in a case that the scheduling request counter is less than the maximum number of scheduling request transmission. The processing circuitry may further be configured and/or programmed to further transmit, to an evolved Node B (eNB) the SR on either or both of the PUCCH on a primary cell and the PUCCH on a secondary cell.

Another evolved Node B (eNB) is described. The eNB includes a processing circuitry. The processing circuitry is configured and/or programmed to transmit an Activation/Deactivation Medium Access Control (MAC) Control Element (CE), and receive, from a user equipment (UE), a scheduling request (SR) on a Physical Uplink Control Channel (PUCCH). The SR is transmitted by the UE based on whether scheduling request counter is less than the maximum number of scheduling request transmission and the scheduling request counter is incremented in a case that the scheduling request counter is less than the maximum number of scheduling request transmission and a value related to the maximum number of scheduling request transmission is set based on whether a secondary cell is activated. The SR may be transmitted on either or both of the PUCCH on a primary cell and the PUCCH on a secondary cell.

Yet another method by a user equipment (UE) is described. The method includes receiving by a Radio Resource Control (RRC) entity of the UE, a Physical Uplink Control Channel (PUCCH)/Sounding Reference Signal (SRS) release request from a lower layer of the UE, receiving by the RRC entity of the UE, a PUCCH release request from a lower layer of the UE, applying a default physical channel configuration for a scheduling request configuration for all serving cells, upon receiving the PUCCH/SRS release request from the lower layer of the UE, and applying the default physical channel configuration for a scheduling request configuration for a concerned secondary cell, upon receiving the PUCCH release request from the lower layers of the UE. The default physical channel configuration for the scheduling request configuration is a release and the PUCCH release request is notified by a Medium Access Control (MAC) entity of the UE in a case that a time alignment timer expires, the time alignment timer is associated with a secondary timing advance group (sTAG) and the concerned secondary cell belongs to the sTAG.

Yet another method by an evolved Node B (eNB) is described. The method includes transmitting, to a user equipment (UE), a Timing Advance Command Medium Access Control (MAC) Control Element (CE), and considering that the UE applies a default physical channel configuration for a scheduling request configuration for all serving cells, upon receiving the PUCCH/SRS release request from the lower layer of the UE and the UE applies the default physical channel configuration for a scheduling request configuration for a concerned secondary cell, upon receiving the PUCCH release request from the lower layers of the UE. The default physical channel configuration for the scheduling request configuration is a release and the PUCCH release request is notified, to the lower layer of the UE, by a Medium Access Control (MAC) entity of the UE in a case that a time alignment timer expires, the time alignment timer is associated with a secondary timing advance group (sTAG) and the concerned secondary cell belongs to the sTAG.

Yet another user equipment (UE) is described. The UE includes a processing circuitry. The processing circuitry is configured and/or programmed to receive by a Radio Resource Control (RRC) entity of the UE, a Physical Uplink Control Channel (PUCCH)/Sounding Reference Signal (SRS) release request from a lower layer of the UE, receive by the RRC entity of the UE, a PUCCH release request from a lower layer of the UE, apply a default physical channel configuration for a scheduling request configuration for all serving cells, upon receiving the PUCCH/SRS release request from the lower layer of the UE, and apply the default physical channel configuration for a scheduling request configuration for a concerned secondary cell, upon receiving the PUCCH release request from the lower layers of the UE. The default physical channel configuration for the scheduling request configuration is a release and the PUCCH release request is notified by a Medium Access Control (MAC) entity of the UE in a case that a time alignment timer expires, the time alignment timer is associated with a secondary timing advance group (sTAG) and the concerned secondary cell belongs to the sTAG.

Yet another evolved Node B (eNB) is described. The eNB includes a processing circuitry. The processing circuitry is configured and/or programmed to transmit, to a user equipment (UE), a Timing Advance Command Medium Access Control (MAC) Control Element (CE), and consider that the UE applies a default physical channel configuration for a scheduling request configuration for all serving cells, upon receiving the PUCCH/SRS release request from the lower layer of the UE and the UE applies the default physical channel configuration for a scheduling request configuration for a concerned secondary cell, upon receiving the PUCCH release request from the lower layers of the UE. The default physical channel configuration for the scheduling request configuration is a release and the PUCCH release request is notified, to the lower layer of the UE, by a Medium Access Control (MAC) entity of the UE in a case that a time alignment timer expires, the time alignment timer is associated with a secondary timing advance group (sTAG) and the concerned secondary cell belongs to the sTAG.

Yet another method by a user equipment (UE) is described. The method includes receiving, from an evolved Node B (eNB), a RRC message including a parameter related to a SR periodicity for a secondary cell and a parameter related to a SR prohibit timer, and setting the SR prohibit timer based on the SR periodicity for the secondary cell.

Setting the SR prohibit timer may be further based on the SR periodicity for the primary cell.

Yet another method by an evolved Node B (eNB) is described. The method includes transmitting, to a user equipment (UE), a RRC message including a parameter related to a SR periodicity for a secondary cell and a parameter related to a SR prohibit timer, and considering that the UE sets the SR prohibit timer based on the SR periodicity for the secondary cell. The method may further include considering that the UE sets the SR prohibit timer based on the SR periodicity for the secondary cell and the SR periodicity for the primary cell.

Yet another user equipment (UE) is described. The UE includes a processing circuitry. The processing circuitry is configured and/or programmed to receive, from an evolved Node B (eNB), a RRC message including a parameter related to a SR periodicity for a secondary cell and a parameter related to a SR prohibit timer, and set the SR prohibit timer based on the SR periodicity for the secondary cell. To set the SR prohibit timer is further based on the SR periodicity for the primary cell.

Yet another evolved Node B (eNB) is described. The eNB includes a processing circuitry. The processing circuitry is configured and/or programmed to transmit, to a user equipment (UE), a RRC message including a parameter related to a SR periodicity for a secondary cell and a parameter related to a SR prohibit timer, and consider that the UE set the SR prohibit timer based on the SR periodicity for the secondary cell. The processing circuitry may be further configured and/or programmed to consider that the UE sets the SR prohibit timer based on the SR periodicity for the secondary cell and the SR periodicity for the primary cell.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases (Rel-) 8, 9, 10, 11, 12 and/or 13). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE (User Equipment), an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink (DL) and optionally uplink (UL) resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The eNBs may also be connected by the S1 interface to the evolved packet core (EPC). For instance, the eNBs may be connected to a mobility management entity (MME) by the S1-MME interface and to the serving gateway (S-GW) by the S1-U interface 433a. The S1 interface supports a many-to-many relation between MMEs, serving gateways and the eNBs. The S1-MME interface is the S1 interface for the control plane and the S1-U interface is the S1 interface for the user plane. The Uu interface is a radio interface between the UE and the eNB for the radio protocol of E-UTRAN 435a.

The radio protocol architecture of E-UTRAN may include the user plane and the control plane. The user plane protocol stack may include packet data convergence protocol (PDCP), radio link control (RLC), medium access control (MAC) and physical (PHY) layers. A DRB (Data Radio Bearer) is a radio bearer that carries user data (as opposed to control plane signaling). For example, a DRB may be mapped to the user plane protocol stack. The PDCP, RLC, MAC and PHY sublayers (terminated at the eNB 460a on the network) may perform functions (e.g., header compression, ciphering, scheduling, ARQ and HARQ) for the user plane. PDCP entities are located in the PDCP sublayer. RLC entities are located in the RLC sublayer. MAC entities are located in the MAC sublayer. The PHY entities are located in the PHY sublayer.

The control plane may include a control plane protocol stack. The PDCP sublayer (terminated in eNB on the network side) may perform functions (e.g., ciphering and integrity protection) for the control plane. The RLC and MAC sublayers (terminated in eNB on the network side) may perform the same functions as for the user plane. The Radio Resource Control (RRC) (terminated in eNB on the network side) may perform the following functions. The RRC may perform broadcast functions, paging, RRC connection management, radio bearer (RB) control, mobility functions, UE measurement reporting and control. The Non-Access Stratum (NAS) control protocol (terminated in MME on the network side) may perform, among other things, evolved packet system (EPS) bearer management, authentication, evolved packet system connection management (ECM)-IDLE mobility handling, paging origination in ECM-IDLE and security control.

Signaling Radio Bearers (SRBs) are Radio Bearers (RB) that may be used only for the transmission of RRC and NAS messages. Three SRBs are defined. SRB0 may be used for RRC messages using the common control channel (CCCH) logical channel. SRB1 may be used for RRC messages (which may include a piggybacked NAS message) as well as for NAS messages prior to the establishment of SRB2, all using the dedicated control channel (DCCH) logical channel. SRB2 may be used for RRC messages which include logged measurement information as well as for NAS messages, all using the DCCH logical channel. SRB2 has a lower-priority than SRB1 and may be configured by E-UTRAN (e.g., eNB) after security activation. A broadcast control channel (BCCH) logical channel may be used for broadcasting system information. Some of BCCH logical channel may convey system information which may be sent from the E-UTRAN to the UE via BCH (Broadcast Channel) transport channel. Some of BCCH logical channel may convey system information which may be sent from the E-UTRAN to the UE via DL-SCH (Downlink Shared Channel) transport channel.

For example, the DL-DCCH logical channel may be used (but not limited to) for a RRC connection reconfiguration message, a RRC connection reestablishment message, a RRC connection release, a UE Capability Enquiry message, a DL Information Transfer message or a Security Mode Command message. UL-DCCH logical channel may be used (but not limited to) for a measurement report message, a RRC Connection Reconfiguration Complete message, a RRC Connection Reestablishment Complete message, a RRC Connection Setup Complete message, a Security Mode Complete message, a Security Mode Failure message, a UE Capability Information, message, a UL Handover Preparation Transfer message, a UL Information Transfer message, a Counter Check Response message, a UE Information Response message, a Proximity Indication message, a RN (Relay Node) Reconfiguration Complete message, an MBMS Counting Response message, an inter Frequency RSTD Measurement Indication message, a UE Assistance Information message, an In-device Coexistence Indication message, an MBMS Interest Indication message, an SCG Failure Information message. DL-CCCH logical channel may be used (but not limited to) for a RRC Connection Reestablishment message, a RRC Connection Reestablishment Reject message, a RRC Connection Reject message, or a RRC Connection Setup message. UL-CCCH logical channel may be used (but not limited to) for a RRC Connection Reestablishment Request message, or a RRC Connection Request message.

The UE may receive one or more RRC messages from the eNB to obtain RRC configurations or parameters. The RRC layer of the UE may configure RRC layer and/or lower layers (e.g., PHY layer, MAC layer, RLC layer, PDCP layer) of the UE according to the RRC configurations or parameters which may be configured by the RRC messages, broadcasted system information, and so on. The eNB may transmit one or more RRC messages to the UE to cause the UE to configure RRC layer and/or lower layers of the UE according to the RRC configurations or parameters which may be configured by the RRC messages, broadcasted system information, and so on.

When carrier aggregation is configured, the UE may have one RRC connection with the network. One radio interface may provide carrier aggregation. During RRC connection establishment, re-establishment and handover, one serving cell may provide Non-Access Stratum (NAS) mobility information (e.g., a tracking area identity (TAI)). During RRC connection re-establishment and handover, one serving cell may provide a security input. This cell may be referred to as the primary cell (PCell). In the downlink, the component carrier corresponding to the PCell may be the downlink primary component carrier (DL PCC), while in the uplink it may be the uplink primary component carrier (UL PCC).

Depending on UE capabilities, one or more SCells may be configured to form together with the PCell a set of serving cells. In the downlink, the component carrier corresponding to an SCell may be a downlink secondary component carrier (DL SCC), while in the uplink it may be an uplink secondary component carrier (UL SCC).

The configured set of serving cells for the UE, therefore, may consist of one PCell and one or more SCells. For each SCell, the usage of uplink resources by the UE 102 (in addition to the downlink resources) may be configurable. The number of DL SCCs configured may be larger than or equal to the number of UL SCCs and no SCell may be configured for usage of uplink resources only.

From a UE viewpoint, each uplink resource may belong to one serving cell. The number of serving cells that may be configured depends on the aggregation capability of the UE. The PCell may only be changed using a handover procedure (e.g., with a security key change and a random access procedure). A PCell may be used for transmission of the PUCCH. A primary secondary cell (PSCell) may also be used for transmission of the PUCCH. The PCell or PSCell may not be de-activated. Re-establishment may be triggered when the PCell experiences radio link failure (RLF), not when the SCells experience RLF. Furthermore, NAS information may be taken from the PCell.

The reconfiguration, addition and removal of SCells may be performed by RRC. At intra-LTE handover, Radio Resource Control (RRC) layer may also add, remove or reconfigure SCells for usage with a target PCell. When adding a new SCell, dedicated RRC signaling may be used for sending all required system information of the SCell (e.g., while in connected mode, UEs need not acquire broadcasted system information directly from the SCells).

The systems and methods described herein may enhance the efficient use of radio resources in Carrier aggregation (CA) operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single eNB is assumed to provide multiple serving cells for a UE. Even in scenarios where two or more cells may be aggregated (e.g., a macro cell aggregated with remote radio head (RRH) cells) the cells may be controlled (e.g., scheduled) by a single eNB.

As has been recognized already, not all the CA aspects scale directly with an increasing number of component carriers. As an example, if the number of CA capable UEs and/or the aggregated CCs is increased, the cell used as a primary cell (PCell) may be highly loaded. This may be because there are key features which are applied to the PCell only, i.e. the Physical Uplink Control Channel (PUCCH) transmission. The increase in the number of supported component carriers may call for rather large increase in the required PUCCH payload size per CA UE, which may create even more severe impact on PCell uplink (UL) load with increasing number of CA UEs. Accommodating all the PUCCH transmissions in the PCell apparently may impact performance, especially for the non-CA UEs. In this case, the PCell-change between the macro cell and a small cell served by an RRH can distribute the PUCCH resources of UEs in the network and hence can resolve the overload issue. However, this may eliminate the benefit of installation of the small cell equipment like RRH in a simple manner.

In Rel-12, Dual Connectivity (DC) was developed, in which the UE may be required to be capable of UL-CA with simultaneous PUCCH/PUCCH and PUCCH/PUSCH transmissions across cell-groups (CGs). In a small cell deployment scenario, each node (e.g., eNB, RRH, etc.) may have its own independent scheduler. To maximize the efficiency of radio resources utilization of both nodes, a UE may connect to two or more nodes that have different schedulers. A UE may be configured multiple groups of serving cells, where each group may have carrier aggregation operation (e.g., if the group includes more than one serving cell). A UE in RRC_CONNECTED may be configured with Dual Connectivity, when configured with a Master and a Secondary Cell Group. A Cell Group (CG) may be a subset of the serving cells of a UE, configured with Dual Connectivity (DC), i.e. a Master Cell Group (MCG) or a Secondary Cell Group (SCG). The Master Cell Group may be a group of serving cells of a UE comprising of the PCell and zero or more secondary cells. The Secondary Cell Group (SCG) may be a group of secondary cells of a UE, configured with DC, comprising of the PSCell and zero or more other secondary cells. A Primary Secondary Cell (PSCell) may be the SCG cell in which the UE is instructed to perform random access when performing the SCG change procedure. In Dual Connectivity, two MAC entities may be configured in the UE: one for the MCG and one for the SCG. Each MAC entity may be configured by RRC with a serving cell supporting PUCCH transmission and contention based Random Access. In a MAC layer, the term Special Cell (SpCell) may refer to such cell, whereas the term SCell may refer to other serving cells. The term SpCell either may refer to the PCell of the MCG or the PSCell of the SCG depending on if the MAC entity is associated to the MCG or the SCG, respectively. A Timing Advance Group (TAG) containing the SpCell of a MAC entity may be referred to as primary TAG (pTAG), whereas the term secondary TAG (sTAG) refers to other TAGs.

The MAC entity has a configurable timer (i.e., a time alignment timer (timeAlignmentTimer)) per TAG. The timeAlignmentTimer is used to control how long the MAC entity considers the Serving Cells belonging to the associated TAG to be uplink time aligned. The eNB may configure the UE with each value for the time alignment timer for each TAG. The UE may receive a Timing Advance Command MAC control element from a eNB. The Timing Advance Command MAC CE may indicate a TAG and a Timing Advance Command. The Timing Advance Command field in the Timing Advance Command MAC CE may indicate an index value $T_A$ (0, 1, 2 . . . 63) used to control the amount of timing adjustment that MAC entity has to apply. The UE may apply the Timing Advance Command for an indicated TAG. The UE may start or restart the timeAliggnmentTimer associated with the indicated TAG. In a case that a timeAlignmentTimer expires and the timeAlignmentTimer is associated with the pTAG, the UE may flush all HARQ buffers for all serving cells, may notify RRC to release Physical Uplink Control Channel (PUCCH)/Sounding Reference Signal (SRS) for all serving cells, may clear any configured downlink assignments and uplink grants, and may consider all running timeAlignmentTimers as expired. In a case that a timeAlignmentTimer expires and the timeAlignmentTimer is associated with an sTAG, for all Serving Cells belonging to this TAG, the UE may flush all HARQ buffers, and may notify RRC to release SRS.

The UE may receive an Activation/Deactivation Command MAC control element from a eNB. The network (e.g., eNB) may activate and deactivate the SCell(s) by sending the Activation/Deactivation MAC control element. The Activation/Deactivation MAC control element may include a field Ci. If there is an SCell configured with SCellIndex i, Ci field indicates the activation/deactivation status of the SCell with SCellIndex i. The Ci field is set to "1" to indicate that the SCell with SCellIndex i is activated. The Ci field is set to "0" to indicate that the SCell with SCellIndex i is deactivated.

Under Rel-12 DC, the PUCCH on the secondary cell (SCell) for CA was supposed to be introduced by reusing the PUCCH mechanism (e.g., PUCCH on PSCell) for DC as much as possible, but the PUCCH on the secondary cell (SCell) for CA was not introduced in Rel-12. PUCCH on SCell for CA can ease the burden in terms of PUCCH considering an increase in the number of DL carriers that can be aggregated.

Under Rel-13 CA, the PUCCH on the SCell may be introduced. The UE may be configured with a plurality of PUCCH groups. One MAC entity may be configured with the plurality of the PUCCH groups. A PUCCH SCell may be an SCell that is configured with PUCCH. A Primary PUCCH group (PPG) may be a group of serving cells including SpCell whose PUCCH signaling is associated with the PUCCH on SpCell. A Secondary PUCCH group (SPG) may be a group of SCells whose PUCCH signaling is associated with the PUCCH on the PUCCH SCell. There may be no contention based random access on the PUCCH SCell. PUCCH mapping of serving cells may be configured by RRC. Activation/Deactivation may be supported for the PUCCH SCell. The SCell and The PUCCH SCell may not support radio link monitoring though the SpCell may support radio link monitoring.

The functions of the different MAC entities in the UE may operate independently if not otherwise indicated. The timers and parameters used in each MAC entity may be configured independently if not otherwise indicated. The Serving Cells, Cell-Radio Network Temporary Identifier (RNTI) (C-RNTI), radio bearers, logical channels, upper and lower layer entities, Logical Channel Groups (LCGs), and HARQ entities considered by each MAC entity may refer to those mapped to that MAC entity if not otherwise indicated.

These MAC entities may handle the following transport channels:
  Broadcast Channel (BCH);
  Downlink Shared Channel(s) (DL-SCH);
  Paging Channel (PCH);
  Uplink Shared Channel(s) (UL-SCH);
  Random Access Channel(s) (RACH);
  Multicast Channel(s) (MCH).

These MAC entities may use timers. A timer is running once it is started, until it is stopped or until it expires; otherwise it is not running A timer can be started if it is not running or restarted if it is running A timer may be always started or restarted from its initial value.

If the MAC entity is configured with one or more SCells, there may be multiple Downlink Shared Channel(s) (DL-SCH) and there may be multiple Uplink Shared Channel(s) (UL-SCH) and Random Access Channel(s) (RACH) per MAC entity; one DL-SCH and UL-SCH on the SpCell, one DL-SCH, zero or one UL-SCH and zero or one RACH for each SCell. A Transmission Time Interval (TTI) may be a subframe (i.e, 1 ms).

In one implementation of the MAC entity, a scheduling request procedure which is summarized in Listing (1) may be performed if the MAC entity is not configured with a SPG.

The Scheduling Request (SR) may be used for requesting UL-SCH resources for new transmission. When an SR is triggered, it may be considered as pending until it is cancelled. All pending SR(s) may be cancelled and SR prohibit timer (sr-ProhibitTimer) may be stopped when a MAC Protocol Data Unit (PDU) is assembled and this PDU includes a Buffer Status Report (BSR) which contains buffer status up to (and including) the last event that triggered a BSR, or when the UL grant(s) can accommodate all pending data available for transmission.

Listing (1)

If an SR is triggered and there is no other SR pending, the MAC entity may set the SR_COUNTER to 0.
As long as one SR is pending, the MAC entity may for each TTI:
  - if no UL-SCH resources are available for a transmission
    in this TTI:
    - if the MAC entity has no valid PUCCH resource for SR
      configured in any TTI:
    initiate a Random Access procedure on the SpCell and cancel
    all pending SRs;
    - else if the MAC entity has a valid PUCCH resource for SR
      configured for this TTI
    and if this TTI is not part of a measurement gap and if
    sr-ProhibitTimer is not running:
      - if SR_COUNTER < dsr-TransMax:
        - increment SR_COUNTER by 1;
        - instruct the physical layer to signal SR on PUCCH;
        - start the sr-ProhibitTimer.
      - else:
        - notify RRC to release PUCCH/Sounding Reference Signal
          (SRS) for all serving cells;
        - clear any configured downlink assignments and uplink grants;
        - initiate a Random Access procedure on the SpCell and cancel
          all pending SRs.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more evolved Node Bs (eNBs) 160 and one or more user equipments (UEs) 102 in which systems and methods for accommodating specific UEs may be implemented. The one or more UEs 102 may communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the eNBs 160 described herein may be implemented in a single device. For example, multiple eNBs 160 may be combined into a single device in some implementations. In the context of FIG. 1, for instance, a single device may include one or more UEs 102 in accordance with the systems and methods described herein. Additionally or alternatively, one or more eNBs 160 in accordance with the systems and methods described herein may be implemented as a single device or multiple devices.

The UE 102 and the eNB 160 may use one or more channels 119, 121 to communicate with each other. For example, a UE 102 may transmit information or data to the eNB 160 using one or more uplink channels 121 and signals. Examples of uplink channels 121 include a physical random access channel (PRACH), a physical uplink control channel (PUCCH) and a physical uplink shared channel (PUSCH), etc. Examples of uplink signals include a demodulation reference signal (DMRS) and a sounding reference signal (SRS), etc. The one or more eNBs 160 may also transmit information or data to the one or more UEs 102 using one or more downlink channels 119 and signals, for instance. Examples of downlink channels 119 include a PDCCH, a PDSCH, an enhanced PDCCH (EPDCCH), etc. Examples of downlink signals include a primary synchronization signal (PSS), a cell-specific reference signal (CRS), and a channel state information (CSI) reference signal (CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE PUCCH resource control module 126, a UE scheduling request operation module 128, a UE Time Alignment operation Module 129, and a UE Activation/Deactivation Module 130. In some implementations, the UE operations module 124 may include physical (PHY) entities, Medium Access Control (MAC) entities, Radio Link Control (RLC) entities, packet data convergence protocol (PDCP) entities, and an Radio Resource Control (RRC) entity.

The UE operations module 124 may provide the benefit of performing a scheduling request procedure efficiently. The UE PDCCH resource control module 126 may control PDCCH Groups and PDCCH resources and control parameters in PDCCH resource configuration. The UE scheduling request operation module 128 may perform a scheduling request procedure. The UE Time Alignment operation module 129 may perform a time alignment procedure including maintenance of uplink time alignment. The UE Activation/Deactivation module 130 may perform an Activation/Deactivation procedure.

The UE operations module 124 may provide information 148 to the one or more receivers 120. For example, the UE operations module 124 may inform the receiver(s) 120 when or when not to receive transmissions based on the RRC message (e.g, broadcasted system information, RRC connection reconfiguration message), MAC control element (CE), and/or the DCI (Downlink Control Information).

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, one or more data buffers 162 and one or more eNB operations modules 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB decoded signal 168 may provide data (e.g., PUCCH transmission data) that may be used by the eNB operations module 182 to perform one or more operations.

In general, the eNB operations module 182 may enable the eNB 160 to communicate with the one or more UEs 102. The eNB operations module 182 may include one or more of an eNB PUCCH resource control module 194, an eNB scheduling request operation module 196, an eNB Time Alignment operation module 197, and an eNB Activation/Deactivation module 198. The eNB operations module 182 may include PHY entities, MAC entities, RLC entities, PDCP entities, and an RRC entity.

The eNB operations module 182 may provide the benefit of performing a scheduling request procedure efficiently. The eNB PUCCH resource control module 194 may control PUCCH Groups and PUCCH resources and control parameters in PUCCH resource configuration. The eNB scheduling request operation module 196 may perform a scheduling request procedure. The eNB Time Alignment operation module 197 may perform the time alignment procedure including maintenance of uplink time alignment. The eNB Activation/Deactivation module 198 may perform an Activation/Deactivation procedure.

The eNB operations module 182 may provide information 190 to the one or more receivers 178. For example, the eNB operations module 182 may inform the receiver(s) 178 when or when not to receive transmissions based on the RRC message (e.g, broadcasted system information, RRC connection reconfiguration message), MAC control element, and/or the DCI (Downlink Control Information).

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

In general, the eNB operations module 182 may enable the eNB 160 to communicate with one or more network nodes (e.g., a mobility management entity (MME), serving gateway (S-GW), eNBs). The eNB operations module 182 may also generate a RRC connection reconfiguration message to be signaled to the UE 102.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
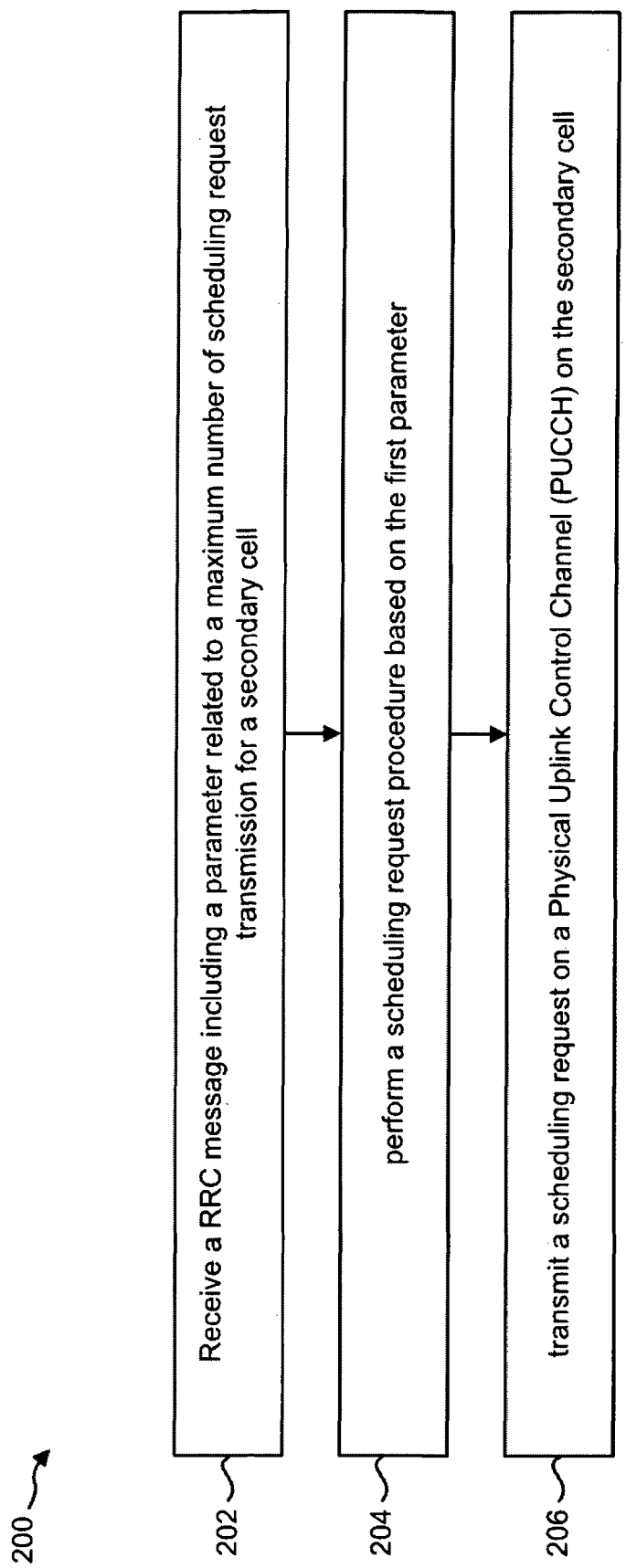
FIG. 2 is a flow diagram illustrating one implementation of a method for performing a scheduling request procedure by a UE.

FIG. 2 is a flow diagram illustrating one implementation of a method 200 for performing a scheduling request procedure by a UE 102.

The UE 102 may 202 receive one or more RRC messages from the eNB 160 to configure one or more of PUCCH Cell Groups, the PUCCH SCell, and SR. The RRC layer of the UE 102 may configure RRC layer and/or lower layers (e.g., PHY layer, MAC layer, RLC layer, PDCP layer) of the UE 102 according to RRC configurations which may be configured by the RRC messages, broadcasted system information, and so on. For example, the UE 102 may 202 receive a RRC message including a first parameter (e.g., dsr-TransMax) related to a maximum number of scheduling request transmission for a secondary cell. The UE 102 may 204 perform a scheduling request procedure based on the first parameter.

The PHY layer of the UE 102 may be configured by higher layers (e.g., MAC layer, RLC layer, PDCP layer, RRC layer) to 206 transmit the SR on one antenna port or two antenna ports on a PUCCH on a primary cell and/or on a PUCCH on a secondary cell. The scheduling request may be transmitted on the PUCCH resource(s)

$$n_{PUCCH,SRI}^{(1,\tilde{p})} = n_{PUCCH,SRI}^{(1,\tilde{p})} \text{ for } \tilde{p}$$

mapped to antenna port p as defined in 3GPP TS 36.211, where $$n_{PUCCH,SRI}^{(1,\tilde{p})}$$

is configured by the higher layers unless the SR coincides in time with the transmission of HARQ-ACK using PUCCH Format 3 in which case the SR is multiplexed with HARQ-ACK according to subclause 5.2.3.1 of 3GPP TS 36.212. The SR configuration for SR transmission periodicity (may be referred as to SR periodicity) $SR_{PERIODICITY}$ and SR subframe offset $N_{OFFSET}$, SR may be defined in (1) (from Table 10.1.5-1 in 3GPP TS 36.213) by the parameter SR configuration index (sr-ConfigIndex) $I_{SR}$ given by the higher layers.

SR transmission instances are the uplink subframes satisfying $$10 \times n_f + \lfloor n_s/2 \rfloor - N_{OFFSET,SR}) \bmod SR_{PERIODICITY} = 0.$$

$n_f$ is a System frame number as defined in 3GPP TS 36.211. $n_s$ is a Slot number within a radio frame as defined in 3GPP TS 36.211.

TABLE (1)

UE-specific SR periodicity and subframe offset configuration

| SR configuration Index $I_{SR}$ | SR periodicity (ms) $SR_{PERIODICITY}$ | SR subframe offset $N_{OFFSET, SR}$ |
|---|---|---|
| 0-4 | 5 | $I_{SR}$ |
| 5-14 | 10 | $I_{SR}$ − 5 |
| 15-34 | 20 | $I_{SR}$ − 15 |
| 35-74 | 40 | $I_{SR}$ − 35 |
| 75-154 | 80 | $I_{SR}$ − 75 |
| 155-156 | 2 | $I_{SR}$ − 155 |
| 157 | 1 | $I_{SR}$ − 157 |

A dsr-TransMax information element (IE) may be a parameter which may be used in a scheduling request procedure to specify the maximum number of scheduling request transmission. The Scheduling Request Configuration (SchedulingRequestConfig) IE may be information element in RRC layer and may be used to specify the Scheduling Request related parameters. The SchedulingRequestConfig IE may be configured for the PCell or for the PSCell. In a case that an SCell is configured as the PUCCH SCell, The SchedulingRequestConfig IE may be configured for the PUCCH SCell.

The information element (IE) SchedulingRequestConfig is given below:

```
-- ASN1START
SchedulingRequestConfig::=    CHOICE {
    release NULL,
    setup SEQUENCE {
        sr-PUCCH-ResourceIndex    INTEGER (0..2047),
        sr-ConfigIndex            INTEGER (0..157),
        dsr-TransMax              ENUMERATED {
                                      n4, n8, n16, n32, n64,
                                      spare3, spare2,
spare1}
    }
}
SchedulingRequestConfig-v1020 ::= SEQUENCE {
    sr-PUCCH-ResourceIndexP1-r10    INTEGER (0..247)
    OPTIONAL         -- Need OR
}
-- ASN1STOP
```

For dsr-TransMax IE: the value n4 may correspond to 4 transmissions, n8 corresponds to 8 transmissions and so on. The sr-ConfigIndex IE is a parameter $I_{SR}$. The sr-PUCCH-ResourceIndex IE or the sr-PUCCH-ResourceIndexP1 IE is a parameter $$n_{PUCCH,SRI}^{(1,\tilde{p})}$$

for antenna port P0 and for antenna port P1 respectively. E-UTRAN (e.g., eNB) configures sr-PUCCH-ResourceIndexP1 only if sr-PUCCHResourceIndex is configured. The schedulingRequestConfig IE may include dsr-TransMax, sr-PUCCH-ResourceIndex, and sr-ConfigIndex. The schedulingRequestConfig-v1020 IE may include sr-PUCCH-ResourceIndexP1.

A sr-ProhibitTimer IE may be used to specify expiration time of sr-ProfibitTimer. The schedulingRequestConfig IE and/or schedulingRequestConfig-v1020 IE for the PCell may be included in a PhysicalConfigDedicated IE. The schedulingRequestConfig IE and/or schedulingRequestConfig-v1020 IE for the PSCell may be included in a PhysicalConfigDedicatedPSCell-r12 IE. The schedulingRequestConfig IE and/or schedulingRequestConfig-v1020 IE for the PUCCH SCell may be included in physicalConfigDedicatedSCell-r10 IE. The UE 102 may receive or obtain those information elements from the eNB 160 by using a RRC connection reconfiguration message, a RRC connection reestablishment message or a RRC connection setup message.

The IE Physical Configuration Dedicated (PhysicalConfigDedicated), the IE Physical Configuration Dedicated PSCell-Rel-12 (PhysicalConfigDedicatedPSCell-r12), and the IE Physical Configuration Dedicated SCell-Rel-10 (physicalConfigDedicatedSCell-r10) may be used to specify the UE specific physical channel configuration.

In one implementation of the MAC entity of the UE 102, a scheduling request procedure which is summarized in Listing (2) may be performed 204.

The Scheduling Request (SR) may be used for requesting UL-SCH resources for new transmission. When an SR is triggered, it may be considered as pending until it is cancelled. All pending SR(s) may be cancelled and SR prohibit timer (sr-ProhibitTimer) may be stopped when a MAC Protocol Data Unit (PDU) is assembled and this PDU includes a Buffer Status Report (BSR) which contains buffer status up to (and including) the last event that triggered a BSR, or when the UL grant(s) can accommodate all pending data available for transmission.

If an SR is triggered and there is no other SR pending, the MAC entity may set the SR_COUNTER to 0.
As long as one SR is pending, the MAC entity may for each TTI:
   if no UL-SCH resources are available for a transmission in this TTI:
   if the MAC entity has no valid PUCCH resource for SR configured in any TTI: initiate a Random Access procedure on the SpCell and cancel all pending SRs;
   else lithe MAC entity has a valid PUCCH resource for SR configured for this TTI and if this TTI is not part of a measurement gap and if sr-ProhibitTimer is not running:

---

Listing (2)

---

- if dsr-TransMax for the SpCell is configured:
- set the DSR_TRANSMAXSPCELL to dsr-TransMax for the SpCell, otherwise 0.
- if dsr-TransMax for the PUCCH SCell is configured and the PUCCH SCell is activated:
- set the DSR_TRANSMAXSCELL to dsr-TransMax for the PUCCH SCell, otherwise 0.
- set the DSR_TRANSMAX to DSR_TRANSMAXSPCELL + DSR_TRANSMAXSCELL.
- if SR_COUNTER <DSR_TRANSMAX:
  - increment SR_COUNTER by 1;
  - instruct the physical layer to signal the SR on PUCCH;
  - start the sr-ProhibitTimer.
- else:
  - notify RRC to release PUCCH/Sounding Reference Signal (SRS) for all serving cells;
  - clear any configured downlink assignments and uplink grants;
  - initiate a Random Access procedure on the SpCell and cancel all pending SRs.

---

As long as one SR is pending, The MAC entity of the UE 102 may for each TTI, determine 202 if no UL-SCH resources are available for a transmission in this TTI. The MAC entity of the UE 102 may also determine 202 if the MAC entity has no valid PUCCH resource for SR configured in any TTI. The MAC entity of the UE 102 may also determine 202 if the MAC entity has a valid PUCCH resource for SR configured for this TTI and if this TTI is not part of a measurement gap and if sr-ProhibitTimer is not running if no UL-SCH resources are available for a transmission in this TTI and if the MAC entity has a valid PUCCH resource for SR configured for this TTI and if this TTI is not part of a measurement gap and if sr-ProhibitTimer is not running, the MAC entity of the UE 102 may perform 203 the following steps.

If dsr-TransMax for the SpCell is configured, the MAC entity of the UE 102 may set the DSR_TRANSMAXSPCELL to dsr-TransMax for the SpCell, otherwise 0. If dsr-TransMax for the PUCCH SCell is configured and the PUCCH SCell is activated, the MAC entity of the UE 102 may set the DSR_TRANSMAXSCELL to dsr-TransMax for the PUCCH SCell, otherwise 0.

The MAC entity of the UE 102 may 204 set the DSR_TRANSMAX to DSR_TRANSMAXSPCELL+DSR_TRANSMAXSCELL. Therefore, DSR_TRANSMAX may be an upper limit of the number of SR transmission and may be adjusted based on dsr-TransMax for the PUCCH SCell.

SR_COUNTER may be a valuable which is incremented by 1 when the MAC entity of the UE 102 may instruct the physical layer to signal the SR on PUCCH. The MAC entity of the UE 102 may determine if the SR_COUNTER is less than the DSR_TRANSMAX. In a case that the SR_COUNTER is less than the DSR_TRANSMAX, the MAC entity of the UE 102 may increment SR_COUNTER by 1, may instruct the physical layer to signal the SR on PUCCH, and may start the sr-ProhibitTimer. Otherwise, the MAC entity of the UE 102 may notify the RRC entity of the UE 102 to release PUCCH/Sounding Reference Signal (SRS) for all serving cells, may clear any configured downlink assignments and uplink grants, and may initiate a Random Access procedure on the SpCell and cancel all pending SRs.

In another implementation for setting an upper limit of the number of SR transmission, only one dsr-TransMax may be configured for the MAC entity of the UE 102. The eNB 160 set the dsr-TransMax to a sufficient value considering total number of SR transmission both on the SpCell and on the PUCCH SCell. The MAC entity of the UE 102 may determine if the SR_COUNTER is less than the dsr-TransMax. In a case that the SR_COUNTER is less than the dsr-TransMax, the MAC entity of the UE 102 may increment SR_COUNTER by 1, may instruct the physical layer to signal the SR on PUCCH, and may start the sr-ProhibitTimer. Otherwise, the MAC entity of the UE 102 may notify the RRC entity of the UE 102 to release PUCCH/Sounding Reference Signal (SRS) for all serving cells, may clear any configured downlink assignments and uplink grants, and may initiate a Random Access procedure on the SpCell and cancel all pending SRs.

Figure 5:
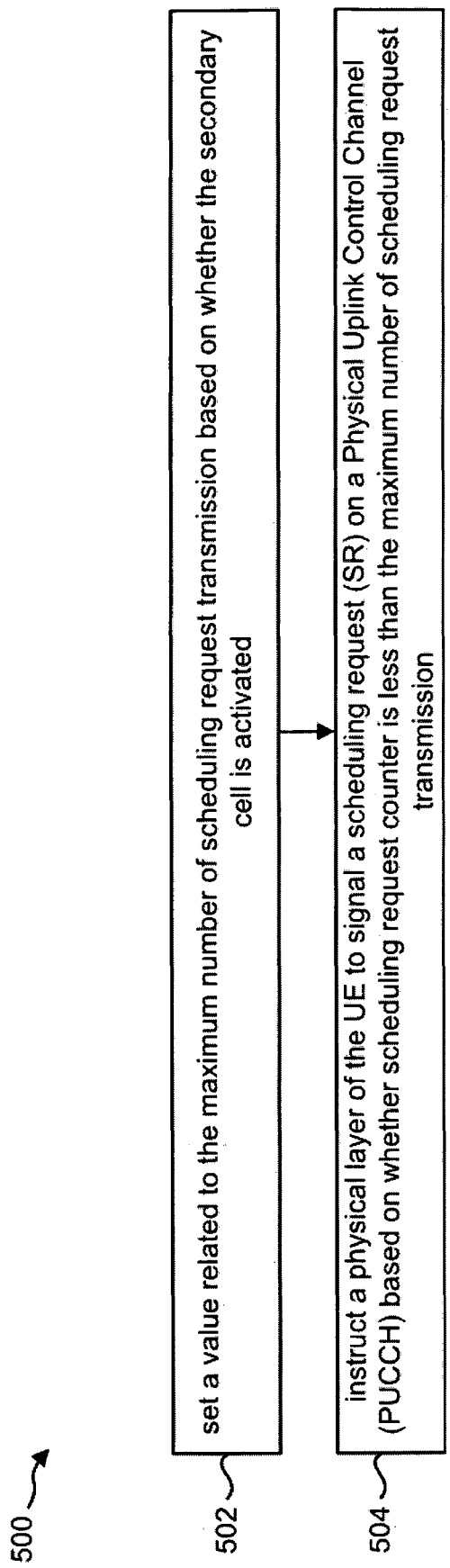
FIG. 5 is a flow diagram illustrating one implementation of a method for performing a scheduling request procedure related to activation/deactivation by a UE.

FIG. 5 is a flow diagram illustrating one implementation of a method 500 for performing a scheduling request procedure related to activation/deactivation by a UE 102. As describe in FIG. 2, if dsr-TransMax for the PUCCH SCell is configured and the PUCCH SCell is activated, the MAC entity of the UE 102 may 502 set the DSR_TRANSMAXSCELL to dsr-TransMax for the PUCCH SCell, otherwise 0. In other words, the UE 102 may 502 set a value (e.g., DSR_TRANSMAX) related to the maximum number of scheduling request transmission based on whether the secondary cell is activated. In a case that the SR_COUNTER is less than the DSR_TRANSMAX, the MAC entity of the UE 102 may increment SR_COUNTER by 1, may 504 instruct the physical layer to signal the SR on PUCCH, and may start the sr-ProhibitTimer.

In one implementation, in a case that the PUCCH SCell is deactivated, the MAC entity of the UE 102 may consider PUCCH resources for SR on the PUCCH SCell as invalid. In a case that the PUCCH SCell is activated, the MAC entity of the UE 102 may apply normal SCell operation including making PUCCH resources for SR on the PUCCH SCell valid. In another implementation, upon deactivation of the PUCCH SCell, the MAC entity of the UE 102 may notify the RRC entity of the UE 102 to release PUCCH for the PUCCH SCell. In these implementations, activation/deactivation can control PUCCH resources efficiently.

In a case that the MAC entity receives an Activation/Deactivation MAC control element in this TTI activating the SCell, the MAC entity may, in a TTI according to a defined timing, activate the SCell. In a case that the MAC entity receives an Activation/Deactivation MAC control element in this TTI deactivating the SCell or in a case that an SCell Deactivation Timer (sCellDeactivationTimer) timer associated with the activated SCell expires in this TTI, the UE 102 may deactivate the SCell in a TTI according to a defined timing. The MAC entity of the UE 102 may maintain a sCellDeactivationTimer timer per configured SCell and deactivate the associated SCell upon its expiry. The MAC entity of the UE 102 may not use sCellDeactivationTimer timer for the PUCCH SCell but other SCells only. The scheduling request procedure related to activation/deactivation may provide benefits of flexibility of configuration of SR configuration, and/or activation/deactivation procedure.

Figure 7:
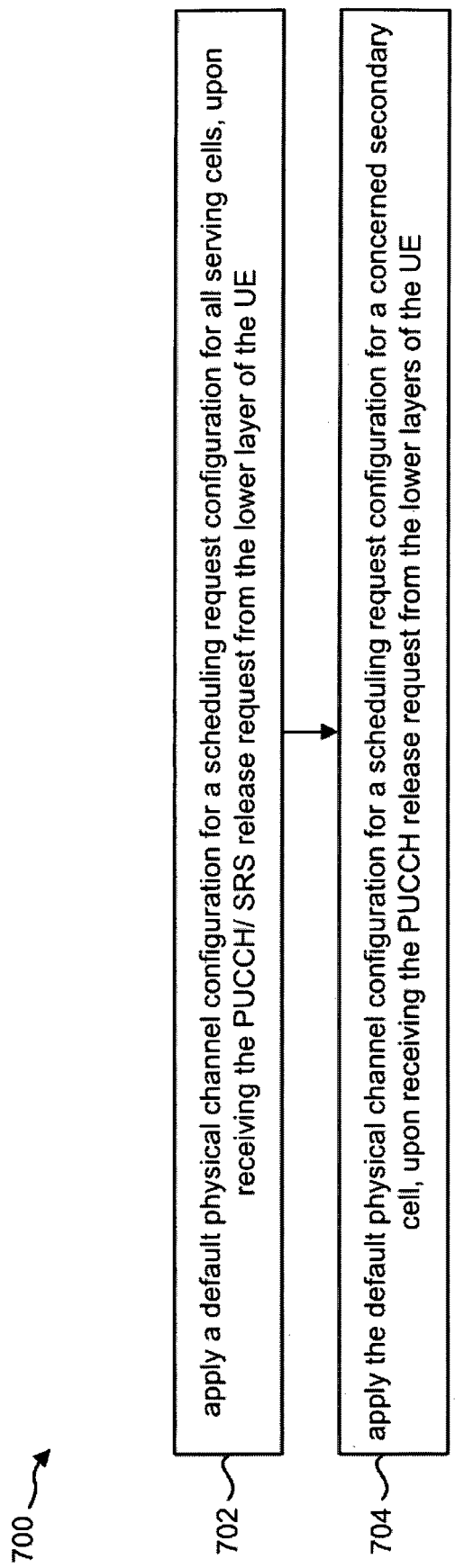
FIG. 7 is a flow diagram illustrating one implementation of a method for performing a PUCCH release procedure related to a scheduling request by a UE.

FIG. 7 is a flow diagram illustrating one implementation of a method 700 for performing a PUCCH release procedure related to a scheduling request. Upon receiving a PUCCH/SRS release request from lower layers (e.g, the MAC entity) of the UE 102, the RRC entity of the UE 102 may apply the default physical channel configuration for cqi-ReportConfig and release cqi-ReportConfigSCell, for each SCell that is configured, if any. Upon receiving a PUCCH/SRS release request from lower layers (e.g., the MAC entity) of the UE 102, the RRC entity of the UE 102 may apply the default physical channel configuration for soundingRS-UL-ConfigDedicated for all serving cells. Upon receiving a PUCCH/SRS release request from lower layers (e.g, the MAC entity) of the UE 102, the RRC entity of the UE 102 may 702 apply the default physical channel configuration for schedulingRequestConfig for all serving cells. The default physical channel configuration for cqi-ReportConfig, for soundingRS-UL-ConfigDedicated and for schedulingRequestConfig may be value "release" or value "N/A". "N/A" indicates that the UE 102 does not apply a specific value. Upon receiving an SRS release request from lower layers, the RRC entity of the UE 102 may apply the default physical channel configuration for soundingRS-UL-ConfigDedicated for the cells of the concerned TAG. Upon receiving a PUCCH release request from lower layers, the RRC entity of the UE 102 may 704 apply the default physical channel configuration for schedulingRequestConfig for the concerned PUCCH Sell or may release schedulingRequestConfig for the concerned PUCCH Sell.

The MAC entity of the UE 102 may receive a Timing Advance Command MAC control element. The Timing Advance Command MAC CE may indicate a TAG and a Timing Advance Command. The Timing Advance Command field in the Timing Advance Command MAC CE may indicate an index value $T_A$ (0, 1, 2 . . . 63) used to control the amount of timing adjustment that MAC entity has to apply. The MAC entity of the UE 102 may apply the Timing Advance Command for an indicated TAG. The MAC entity of UE 102 may start or restart the timeAliggnmentTimer associated with the indicated TAG. In a case that a timeAlignmentTimer expires and the timeAlignmentTimer is associated with the pTAG, the MAC entity of the UE 102 may flush all HARQ buffers for all serving cells, may notify RRC to release Physical Uplink Control Channel (PUCCH)/Sounding Reference Signal (SRS) for all serving cells, may clear any configured downlink assignments and uplink grants, and may consider all running timeAlignmentTimers as expired. In a case that a timeAlignmentTimer expires and the timeAlignmentTimer is associated with an sTAG, for all Serving Cells belonging to this TAG, the MAC entity of the UE 102 may flush all HARQ buffers, may notify RRC to release SRS, and in a case that the PUCCH SCell belongs to this TAG, may notify RRC to release PUCCH. Releasing SCell PUCCH SR may provide benefits of flexibility of configuration of SR configuration, activation/deactivation procedure, and/or time alignment timer setting.

Figure 9:
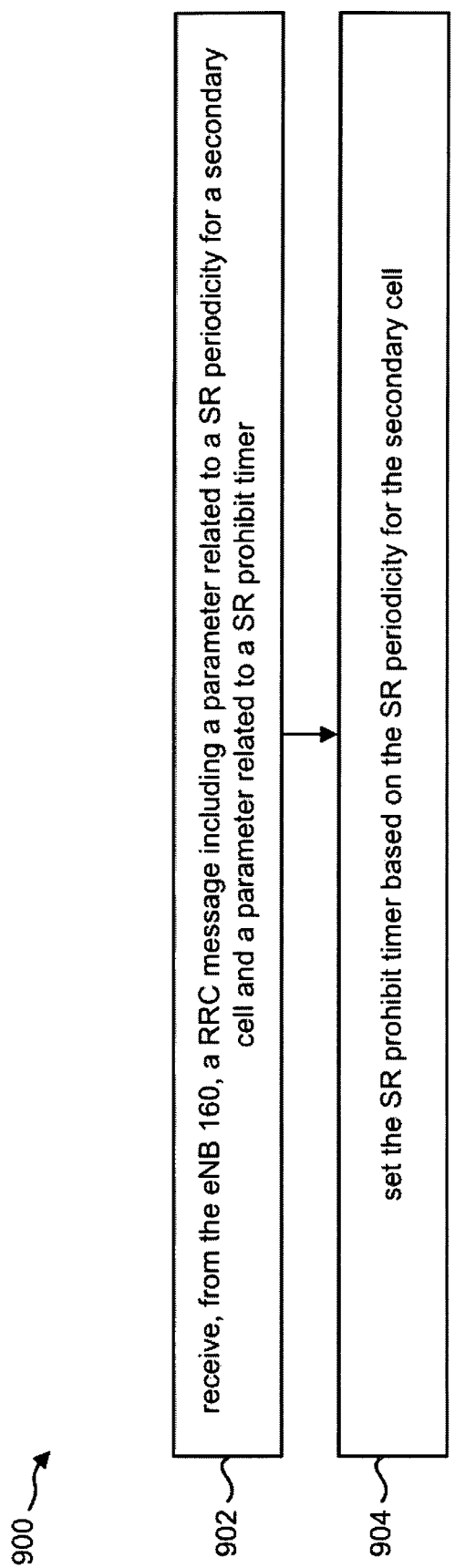
FIG. 9 is a flow diagram illustrating one implementation of a method 900 for setting SR prohibit timer for a scheduling request procedure by the UE.

FIG. 9 is a flow diagram illustrating one implementation of a method 900 for setting SR prohibit timer for a scheduling request procedure. The RRC entity of the UE 102 may receive 902, from the eNB 160, a RRC message including a parameter related to a SR periodicity (i.e., sr-ConfigIndex) for a secondary cell and a parameter related to a SR prohibit timer (i.e. sr-ProhibitTimer). The RRC entity of the UE 102 may 904 set the SR prohibit timer based on the SR periodicity for the secondary cell and may apply the SR prohibit timer. The sr-ConfigIndex may specify a SR periodicity and a SR subframe offset. The sr-Prohibit Timer may be a timer used for SR procedure. The sr-Prohibit timer may be used to prohibit a SR transmission for a certain period. Value 0 means no timer for SR transmission on PUCCH is configured. Value 1 corresponds to one SR period, Value 2 corresponds to 2*SR periods and so on. In a case that the SR is configured for a PCell only, the SR period for determining a timer period may be a SR periodicity for the PCell. In a case that the SR is configured for a SCell only, the SR period for determining a timer period may be a SR periodicity for the SCell. In a case that the SR is configured for a SCell and for a PCell, the SR period for determining a timer period may be a SR periodicity with shorter (or shortest) period between the PCell and the SCell(s). In other word, in a case that SR periodicity configured for the PCell is 8 ms and SR periodicity configured for the SCell is 4 ms, then 4 ms (i.e. shorter) SR periodicity is used for determining the SR prohibit timer period. The UE 102 may set the SR prohibit timer based on the SR periodicity for the secondary cell and the SR periodicity for the primary cell. In another example, in a case that the SR is configured for a SCell and for a PCell, the SR period for determining a timer period may be a SR periodicity with longer (or longest) period between the PCell and the SCell(s). In yet another example, in a case that the SR is configured for a SCell and for a PCell, the SR period for determining a timer period may be a SR periodicity for the PCell. In yet another example, in a case that the SR is configured for a SCell and for a PCell, the SR period for determining a timer period may be a SR periodicity for the PCell. Setting SR prohibit timer based on the SCell SR periodicity may provide benefits of flexibility of configuration of SR prohibit timer and reduction of signaling overhead.

Figures 3, 4A:
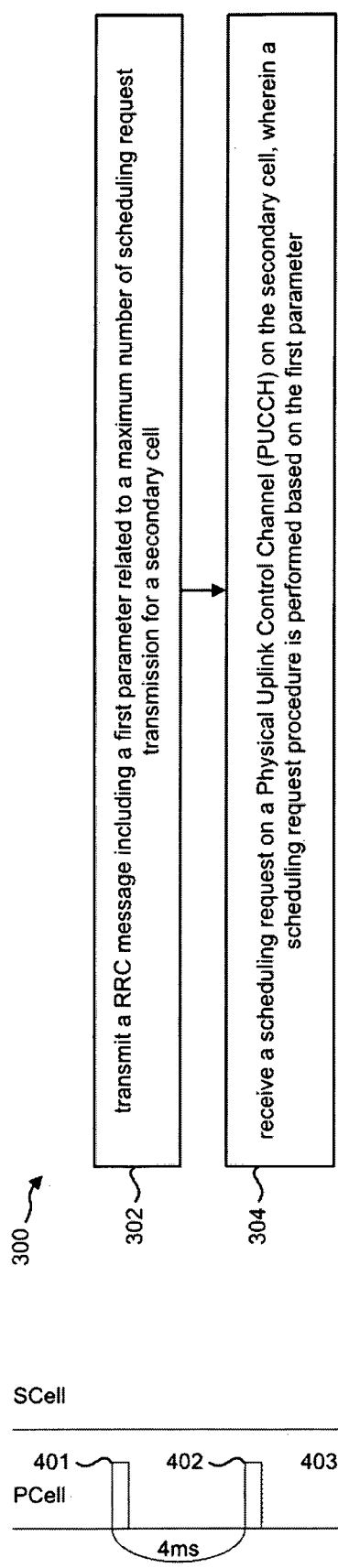
FIG. 3 is a flow diagram illustrating one implementation of a method for performing a scheduling request procedure by an eNB.
FIG. 4a is diagrams illustrating examples for configuration of a scheduling request on a Physical Uplink Control Channel (PUCCH) on a primary cell or a secondary cell.

FIG. 3 is a flow diagram illustrating one implementation of a method 300 for performing a scheduling request procedure by an eNB 160. The eNB 160 may transmit one or more RRC messages to the UE 102 to configure, for the UE 102, one or more of PUCCH Cell Groups, the PUCCH SCell, and SR. The RRC layer of the eNB 160 may assume or consider that the RRC layer of the UE 102 configures RRC layer and/or lower layers (e.g., PHY layer, MAC layer, RLC layer, PDCP layer) of the UE 102 according to RRC configurations which may be configured by the RRC messages, broadcasted system information, and so on. For example, the eNB 160 may 302 transmit a RRC message including a first parameter (e.g., dsr-TransMax) related to a maximum number of scheduling request transmission for a secondary cell. The eNB 160 may 304 receive a scheduling request on a Physical Uplink Control Channel (PUCCH) on the secondary cell, wherein a scheduling request procedure is performed based on the first parameter.

A sr-ProhibitTimer IE, the schedulingRequestConfig IE, schedulingRequestConfig-v1020 IE, PhysicalConfigDedicated IE, a PhysicalConfigDedicatedPSCell-r12 IE, physicalConfigDedicatedSCell-r10 IE, etc may be transmitted from the eNB 160 to the UE 102 by using a RRC connection reconfiguration message, a RRC connection reestablishment message, a RRC connection setup message, etc. eNB 160 may configure UE 102 with dsr-TransMax for the PUCCH SCell. Configuring dsr-TranMax for the PUCCH SCell independently of the PCell may provide benefits of flexibility of configuration of upper limit of the number of SR transmission.

In one implementation of the MAC entity of the eNB 160, the eNB 160 may control or manage a scheduling request procedure which is summarized in Listing (2) and may be performed by the UE 102. The eNB 160 may assume or consider that the UE 102 performs the scheduling request procedure which is described in FIG. 2, FIG. 5, and FIG. 7. The eNB 160 may assume or consider that the UE 102 performs the deactivation procedure which is described in FIG. 2, FIG. 5, and FIG. 7. The eNB 160 may receive a SR on the PUCCH on the SpCell in a case that the eNB 160 configures UE with the SR on the PUCCH on the PCell or PSCell. The eNB 160 may receive a SR on the PUCCH on the PUCCH SCell in a case that the eNB 160 configures UE with the SR on the PUCCH on the PUCCH SCell.

Figure 6:
FIG. 6 is a flow diagram illustrating another implementation of a method for performing a scheduling request procedure related to activation/deactivation by an eNB.

FIG. 6 is a flow diagram illustrating one implementation of a method 600 for performing a scheduling request procedure related to activation/deactivation by an eNB 160. The eNB 160 may 602 transmit an Activation/Deactivation MAC control element. The eNB 160 may 604 receive, from a user equipment (UE), a scheduling request (SR) on a Physical Uplink Control Channel (PUCCH), wherein the SR may be transmitted by the UE based on whether scheduling request counter is less than the maximum number of scheduling request transmission. The scheduling request counter may be incremented in a case that the scheduling request counter is less than the maximum number of scheduling request transmission. A value related to the maximum number of scheduling request transmission may be set based on whether a secondary cell is activated. The scheduling request procedure related to activation/deactivation may provide benefits of flexibility of configuration of SR configuration, and/or activation/deactivation procedure.

Figure 8:
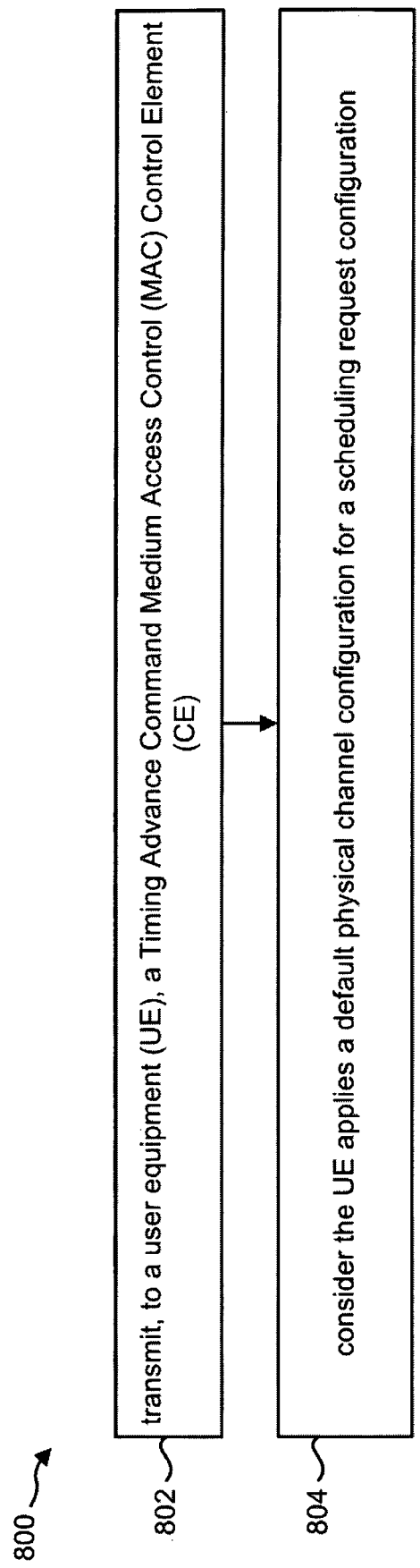
FIG. 8 is a flow diagram illustrating one implementation of a method for performing a PUCCH release procedure related to a scheduling request by an eNB.

FIG. 8 is a flow diagram illustrating one implementation of a method 600 for performing a PUCCH release procedure related to a scheduling request by an eNB 160. The eNB 160 may 802 transmit a Timing Advance Command MAC control element. The eNB 160 may consider that the UE applies a default physical channel configuration for a scheduling request configuration for all serving cells, upon receiving the PUCCH/SRS release request from the lower layer of the UE. eNB may 804 consider the UE applies the default physical channel configuration for a scheduling request configuration for a concerned secondary cell, upon receiving the PUCCH release request from the lower layers of the UE. Releasing SCell PUCCH SR may provide benefits of flexibility of configuration of SR configuration, activation/deactivation procedure, and/or time alignment timer setting.

Figure 10:
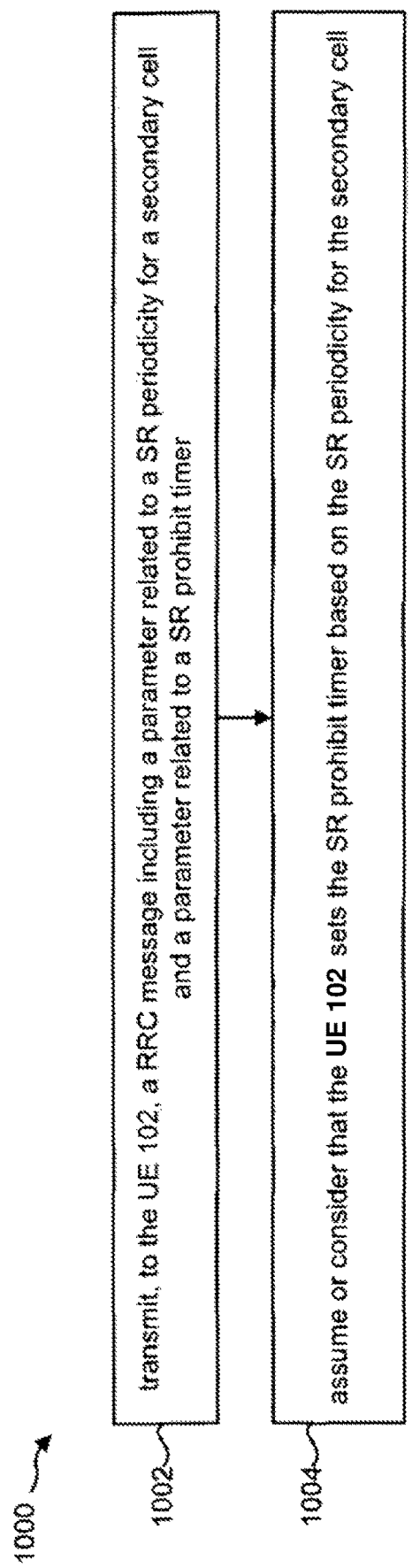
FIG. 10 is a flow diagram illustrating one implementation of a method 1000 for setting SR prohibit timer for a scheduling request procedure by the eNB.

FIG. 10 is a flow diagram illustrating one implementation of a method 1000 for setting SR prohibit timer for a scheduling request procedure by the eNB 160. The RRC entity of the eNB 160 may 1002 transmit, to the UE 102, a RRC message including a parameter related to a SR periodicity (i.e., sr-ConfigIndex) for a secondary cell and a parameter related to a SR prohibit timer (i.e. sr-ProhibitTimer). The eNB 160 may 1004 assume or consider that the UE 102 sets the SR prohibit timer based on the SR periodicity for the secondary cell and may apply the SR prohibit timer. The sr-ConfigIndex may specify a SR periodicity and a SR subframe offset. The sr-Prohibit Timer may be a timer used for SR procedure. The sr-Prohibit timer may be used to prohibit a SR transmission for a certain period. Value 0 means no timer for SR transmission on PUCCH is configured. Value 1 corresponds to one SR period, Value 2 corresponds to 2*SR periods and so on. In a case that the SR is configured for a PCell only, the SR period for determining a timer period may be a SR periodicity for the PCell. Setting SR prohibit timer based on the SCell SR periodicity may provide benefits of flexibility of configuration of SR prohibit timer and reduction of signaling overhead.

Figure 4B:
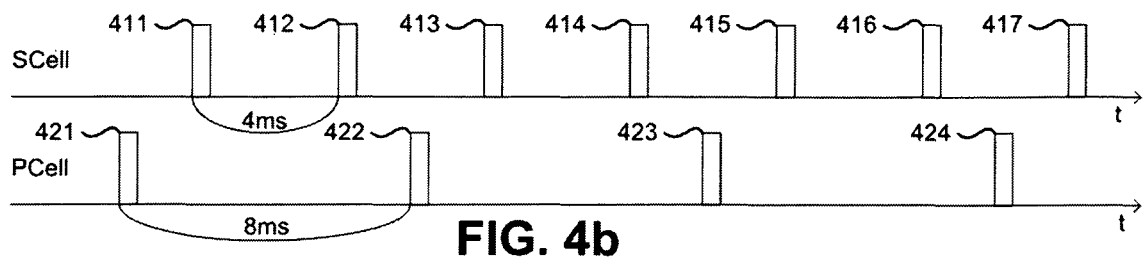
FIG. 4b is diagrams illustrating examples for configuration of a scheduling request on a Physical Uplink Control Channel (PUCCH) on a primary cell or a secondary cell.
Figure 4C:
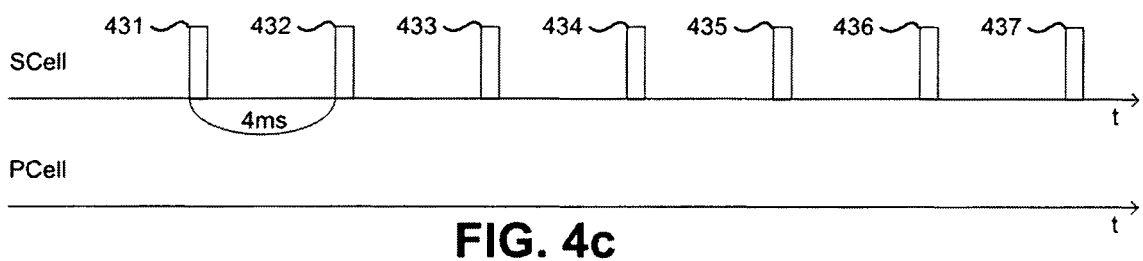
FIG. 4c is diagrams illustrating examples for configuration of a scheduling request on a Physical Uplink Control Channel (PUCCH) on a primary cell or a secondary cell.
Figure 4D:
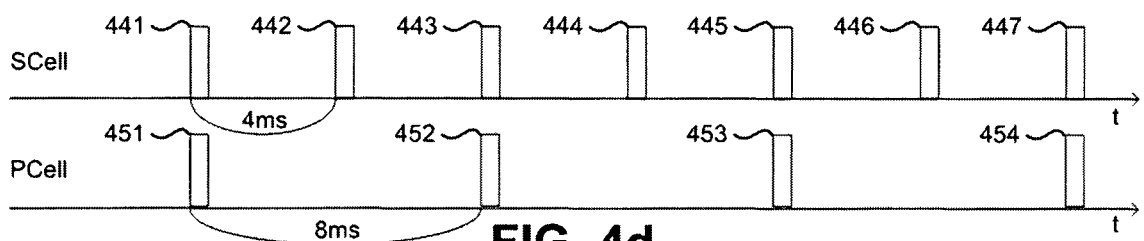
FIG. 4d is diagrams illustrating examples for configuration of a scheduling request on a Physical Uplink Control Channel (PUCCH) on a primary cell or a secondary cell.

FIG. 4a through 4d are diagrams illustrating examples for configuration of SR on a PUCCH on a PCell or an SCell. FIG. 4a shows an example of a case that a PCell for a UE 102 is configured with the schedulingRequestConfig IE. SR resources are shown in 401-407. The scheduling request is configured only for the PCell. SR periodicity is 4 ms. FIG. 4b shows an example of a case that a PCell for a UE 102 is configured with the schedulingRequestConfig IE and an SCell (i.e. PUCCH SCell) for a UE 102 is also configured with schedulingRequestConfig IE. The scheduling request is configured for the PCell and the SCell. SR resources for the SCell are shown in 411-417. SR resources for the SCell are shown in 421-424. SR periodicity for PCell is 8 ms and for SCell is 4 ms. The subframes for resources for the PCell and the SCell are not overlapped based on SR subframe offset. FIG. 4c shows an example of a case that an SCell (i.e. PUCCH SCell) for a UE 102 is configured with the schedulingRequestConfig IE. The scheduling request is configured for the PCell and the SCell. SR resources for the SCell are shown in 431-437. SR periodicity for SCell is 4 ms. FIG. 4d shows another example of a case that a PCell for a UE 102 is configured with the schedulingRequestConfig IE and an SCell (i.e. PUCCH SCell) for a UE 102 is also configured with schedulingRequestConfig IE. The scheduling request is configured for the PCell and the SCell. SR resources for the SCell are shown in 441-447. SR resources for the SCell are shown in 451-454. SR periodicity for PCell is 8 ms and for SCell is 4 ms. The subframes for resources for the PCell and the SCell are overlapped.

As shown FIG. 4c, if the E-UTRAN (e.g, the eNB 160) configure SR subframe offset as SR resources among serving cells in any TTI (i.e. any subframe) are not overlapped, the PHY layer of the UE 102 may not need to handle selection among SR resources or power sharing among SR resources. In a case that the MAC entity of the UE 102 instructs the PHY layer to signal the SR on the PUCCH in a TTI, the PHY layer of the UE 102 may transmit the SR in the TTI according to SR configurations. In the FIG. 4c, if the SCell is deactivated, the number of subframes (i.e., SR transmission occasions) for PUCCH resources for the SR in a certain period may change. Therefore, it may be efficient that dsr-TransMax is configured for each of serving cells configured with the PUCCH (i.e., the PCell and the PUCCH SCell). In these implementations, efficient resource management for the PUCCH for the SR may be provided.

On the other hand, as shown FIG. 4d, if the E-UTRAN (e.g, the eNB 160) configure SR subframe offset as SR resources among serving cells in a TTI (i.e. a subframe) are overlapped, the PHY layer of the UE 102 may need to handle selection among SR resources or power sharing among SR resources. In the FIG. 4d, if the SCell is deactivated, the number of subframes (i.e., SR transmission occasions) for PUCCH resources for the SR in a certain period may not change. Therefore, it may be efficient that one dsr-TransMax is configured for the MAC entity or that the dsr-TransMax for the PUCCH SCell is adjusted based on consideration of sum with dsr-TransMax for the PCell in eNB 160 internally and eNB 160 sends appropriate values for the dsr-TransMax for the PCell and for the SCell. In one implementation, in a case that the MAC entity of the UE 102 instructs the PHY layer to signal the SR on the PUCCH in a TTI, the PHY layer of the UE 102 may transmit the SR on both the PUCCH on the PCell and the PUCCH on the SCell in the TTI according to SR configurations. In another implementation, in a case that the MAC entity of the UE 102 instructs the PHY layer to signal the SR on PUCCH in a TTI, the PHY layer of the UE 102 may transmit the SR on one of the PUCCH on the PCell and the PUCCH on the SCell in the TTI according to SR configurations. eNB 160 may send, to the UE 102, a RRC message to specify whether the UE 102 transmits the SR on both the PUCCH on the PCell and the SCell or not and/or which the PUCCH on the PCell or the PUCCH on the SCell is selected in a collision. In these implementations, efficient resource management for the PUCCH for the SR may be provided.

Figure 11:
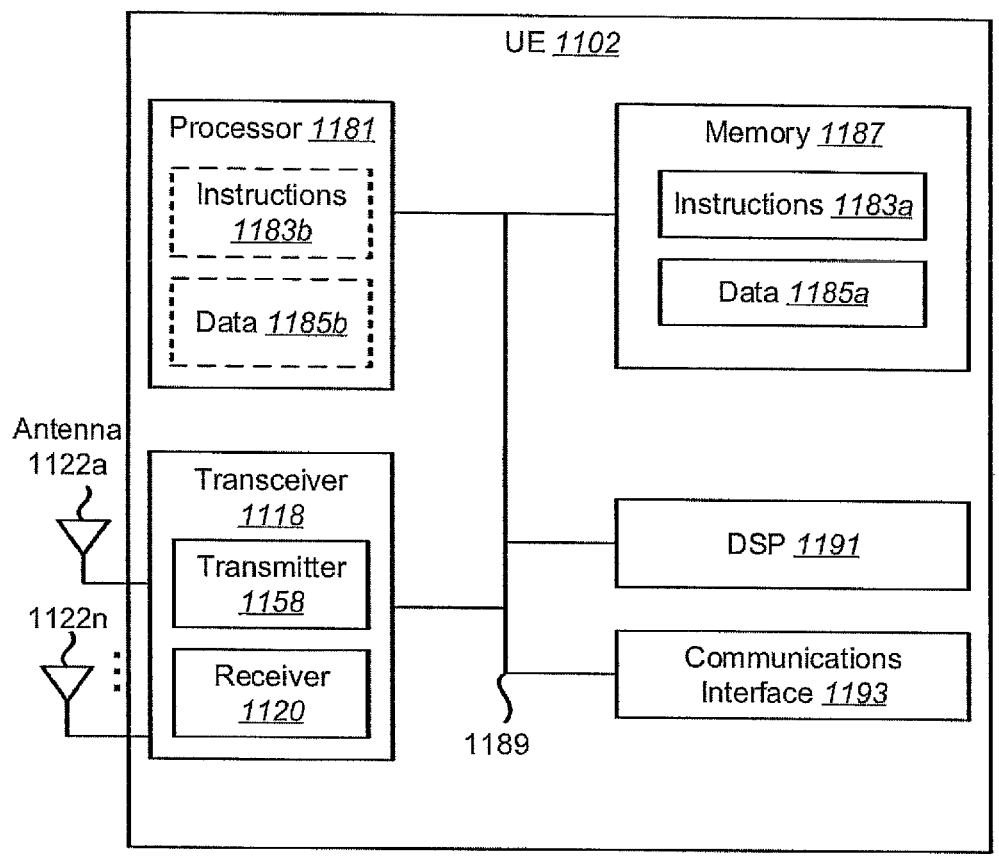
FIG. 11 illustrates various components that may be utilized in a UE.

FIG. 11 illustrates various components that may be utilized in a UE 1102. The UE 1102 described in connection with FIG. 11 may be implemented in accordance with the UE 102 described in connection with FIG. 1. The UE 1102 includes a processor 1181 that controls operation of the UE 1102. The processor 1181 may also be referred to as a central processing unit (CPU). Memory 1187, which may include read-only memory (ROM), random access memory (RAM), a combination of the two or any type of device that may store information, provides instructions 1183a and data 1185a to the processor 1181. A portion of the memory 1187 may also include non-volatile random access memory (NVRAM). Instructions 1183b and data 1185b may also reside in the processor 1181. Instructions 1183b and/or data 1185b loaded into the processor 1181 may also include instructions 1183a and/or data 1185a from memory 1187 that were loaded for execution or processing by the processor 1181. The instructions 1183b may be executed by the processor 1181 to implement one or more of the methods 200, 500, 700 and 900 described above.

The UE 1102 may also include a housing that contains one or more transmitters 1158 and one or more receivers 1120 to allow transmission and reception of data. The transmitter(s) 1158 and receiver(s) 1120 may be combined into one or more transceivers 1118. One or more antennas 1122a-n are attached to the housing and electrically coupled to the transceiver 1118.

The various components of the UE 1102 are coupled together by a bus system 1189, which may include a power bus, a control signal bus and a status signal bus, in addition to a data bus. However, for the sake of clarity, the various buses are illustrated in FIG. 11 as the bus system 1189. The UE 1102 may also include a digital signal processor (DSP) 1191 for use in processing signals. The UE 1102 may also include a communications interface 1193 that provides user access to the functions of the UE 1102. The UE 1102 illustrated in FIG. 11 is a functional block diagram rather than a listing of specific components.

Figure 12:
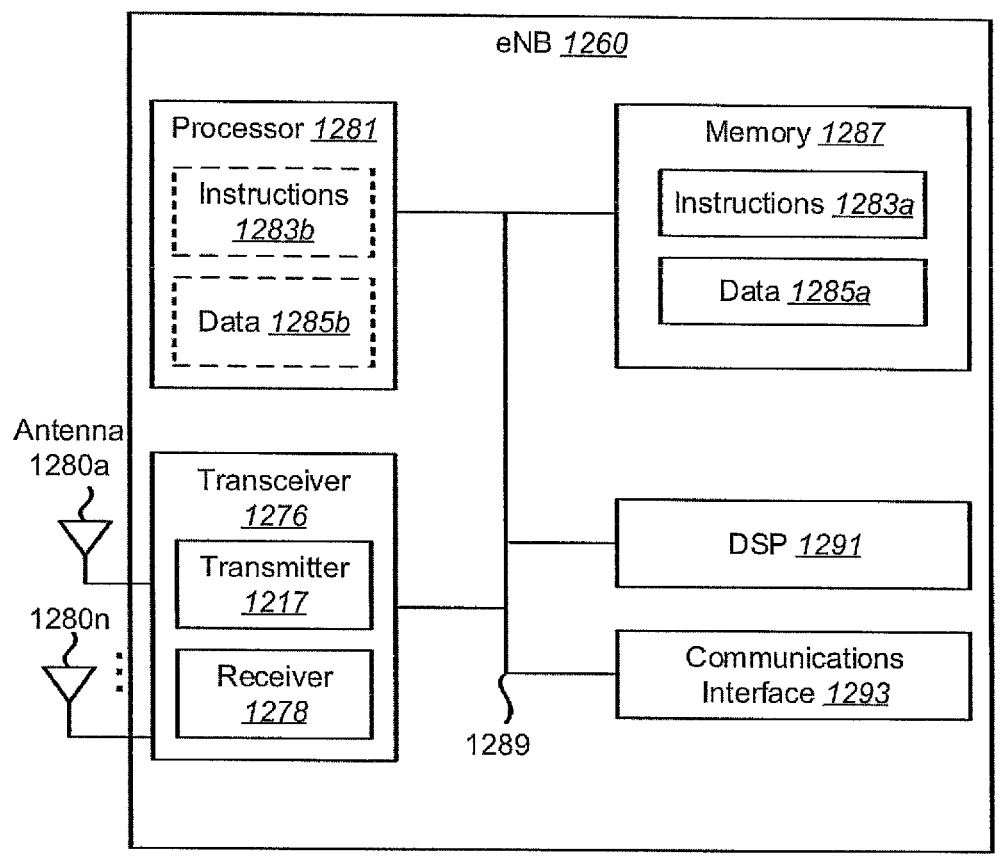
FIG. 12 illustrates various components that may be utilized in an eNB.

FIG. 12 illustrates various components that may be utilized in an eNB 1260. The eNB 1260 described in connection with FIG. 12 may be implemented in accordance with the eNB 160 described in connection with FIG. 1. The eNB 1260 includes a processor 1281 that controls operation of the eNB 1260. The processor 1281 may also be referred to as a central processing unit (CPU). Memory 1287, which may include read-only memory (ROM), random access memory (RAM), a combination of the two or any type of device that may store information, provides instructions 1283a and data 1285a to the processor 1281. A portion of the memory 1287 may also include non-volatile random access memory (NVRAM). Instructions 1283b and data 1285b may also reside in the processor 1281. Instructions 1283b and/or data 1285b loaded into the processor 1281 may also include instructions 1283a and/or data 1285a from memory 1287 that were loaded for execution or processing by the processor 1281. The instructions 1283b may be executed by the processor 1281 to implement one or more of the methods 300, 600, 800 and 1000 described above.

The eNB 1260 may also include a housing that contains one or more transmitters 1217 and one or more receivers 1278 to allow transmission and reception of data. The transmitter(s) 1217 and receiver(s) 1278 may be combined into one or more transceivers 1276. One or more antennas 1280a-n are attached to the housing and electrically coupled to the transceiver 1276.

The various components of the eNB 1260 are coupled together by a bus system 1289, which may include a power bus, a control signal bus and a status signal bus, in addition to a data bus. However, for the sake of clarity, the various buses are illustrated in FIG. 12 as the bus system 1289. The eNB 1260 may also include a digital signal processor (DSP) 1291 for use in processing signals. The eNB 1260 may also include a communications interface 1293 that provides user access to the functions of the eNB 1260. The eNB 1260 illustrated in FIG. 12 is a functional block diagram rather than a listing of specific components.

The term "computer-readable medium" refers to any available medium that can be accessed by a computer or a processor. The term "computer-readable medium," as used herein, may denote a computer- and/or processor-readable medium that is nontransitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray (registered trademark) disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A method by a user equipment (UE), comprising:
   receiving, from an evolved Node B (eNB), an RRC message including a parameter related to a Scheduling Request (SR) periodicity for a Physical Uplink Control Channel (PUCCH) secondary cell and a parameter related to a SR prohibit timer;
   determining a shortest SR period between a SR period of a primary cell and a SR period of the PUCCH secondary cell; and setting the SR prohibit timer based on the shortest SR period.

2. A method by an evolved Node B (eNB), comprising:
transmitting, to a user equipment (UE), an RRC message including a parameter related to a Scheduling Request (SR) periodicity for a Physical Uplink Control Channel (PUCCH) secondary cell and a parameter related to a SR prohibit timer, the RRC message causing the UE to set the SR prohibit timer based on a shortest SR period which is determined between a SR period of a primary cell and a SR period of the PUCCH secondary cell.

3. A user equipment (UE), comprising:
a processing circuitry configured and/or programmed to:
receive, from an evolved Node B (eNB), a RRC message including a parameter related to a Scheduling Request (SR) periodicity for a Physical Uplink Control Channel (PUCCH) secondary cell and a parameter related to a SR prohibit timer;
determine a shortest SR period between a SR period of a primary cell and a SR period of the PUCCH secondary cell; and
set the SR prohibit timer based on the shortest SR period.

4. An evolved Node B (eNB), comprising:
a processing circuitry configured and/or programmed to:
transmit, to a user equipment (UE), an RRC message including a parameter related to a Scheduling Request (SR) periodicity for a Physical Uplink Control Channel (PUCCH) secondary cell and a parameter related to a SR prohibit timer, the RRC message causing the UE to set the SR prohibit timer based on a shortest SR period which is determined between a SR period of a primary cell and a SR period of the PUCCH secondary cell.

* * * * *